US00RE47655E

(19) United States
(12) Reissued Patent
Myers et al.

(10) Patent Number: US RE47,655 E
(45) Date of Reissued Patent: Oct. 22, 2019

(54) SYSTEM AND METHOD FOR FORECASTING PROBABILITY OF PRECIPITATION

(75) Inventors: Joel N. Myers, State College, PA (US); Michael A. Steinberg, State College, PA (US); James T. Candor, State College, PA (US)

(73) Assignee: ACCUWEATHER, INC., State College, PA (US)

(21) Appl. No.: 12/692,335

(22) Filed: Jan. 22, 2010

Related U.S. Patent Documents

Reissue of:
(64) Patent No.: 7,321,827
Issued: Jan. 22, 2008
Appl. No.: 10/733,337
Filed: Dec. 12, 2003

(51) Int. Cl.
*G01W 1/00* (2006.01)
*G01W 1/10* (2006.01)
*G01W 1/14* (2006.01)

(52) U.S. Cl.
CPC ..... *G01W 1/10* (2013.01); *G01W 1/14* (2013.01)

(58) Field of Classification Search
CPC ..... G01W 1/10; G01W 1/14
USPC ..... 702/1, 2, 3, 4; 703/5
See application file for complete search history.

(56) References Cited

U.S. PATENT DOCUMENTS 5,406,481 A 4/1995 Shinozawa et al. ..... 364/420
5,440,483 A 8/1995 Badoche-Jacquet et al. ..... 364/420
5,796,611 A 8/1998 Ochiai et al. ..... 364/420
5,959,567 A * 9/1999 Wolfson et al. ..... 342/26 R
6,128,578 A 10/2000 Sakaino et al. ..... 702/3
6,298,307 B1 10/2001 Murphy et al. ..... 702/3
6,360,172 B1 3/2002 Burfeind et al. ..... 702/2
6,424,917 B1 7/2002 Kalkstein et al. ..... 702/3
6,498,987 B1 12/2002 Kelly et al. ..... 702/3
6,522,972 B2 2/2003 Helms ..... 702/3
6,535,817 B1 3/2003 Krishnamurti
6,542,825 B2 4/2003 Jones et al. ..... 702/3
6,581,009 B1 6/2003 Smith ..... 702/3
6,654,689 B1 11/2003 Kelly et al. ..... 702/3
6,823,264 B1 * 11/2004 Hauge ..... 702/6
6,862,528 B2 * 3/2005 Scannell ..... 702/3
7,069,258 B1 * 6/2006 Bothwell ..... 706/21
(Continued)

FOREIGN PATENT DOCUMENTS

JP 2008185489 A 8/2008
TW 201539019 A 10/2015

OTHER PUBLICATIONS

Byun et al., "On the Supplementary System for Heavy Rain Warning using the Observed Rain Gauge Data and the Predicted NWP" Third US-Korea Joint Workshop on Storm- and Mesoscale Weather Analysis and Prediction, Feb. 20, 2002.*
(Continued)

*Primary Examiner* — William H. Wood
(74) *Attorney, Agent, or Firm* — Blank Rome LLP

(57) ABSTRACT

A system and method are disclosed for forecasting probability of precipitation values and most probable precipitation amount values for, preferably, three hour time period increments starting from the present hour through approximately hour 96 (i.e., four days) or beyond. The values are recalculated at the beginning of each hour, based upon existing forecasting information and meteorological data. The values are communicated to end users through a communications channel such as the Internet.

59 Claims, 12 Drawing Sheets

(56) References Cited

U.S. PATENT DOCUMENTS

| | | | | |
|---|---|---|---|---|
| 7,181,345 | B2 * | 2/2007 | Rosenfeld et al. | 702/3 |
| 7,542,852 | B1 | 6/2009 | Rose | |
| 2002/0114517 | A1 | 8/2002 | Wolfson et al. | 382/181 |
| 2008/0147417 | A1 | 6/2008 | Friedberg | |
| 2012/0101880 | A1 | 4/2012 | Alexander | |
| 2015/0178572 | A1 | 6/2015 | Omer et al. | |
| 2016/0231463 | A1 | 8/2016 | Smith | |
| 2016/0300172 | A1 | 10/2016 | Bangalore et al. | |

OTHER PUBLICATIONS

US Army Corps of Engineers, "The New HEC-1 Flood Hydrograph Package", www.hec.usace.army.mil, May 1981, pp. 1-13 (17 total).*
Gringorten, "A Measure of Skill in Forecasting a Continuous Variable" United States Air Force, Office of Aerospace Research, Air Force Cambridge Research Laboratories, Aerospace Instrumentation Laboratory, Issue 414, 1965.*
Help with FOUS Data: Model Ouput Statistics, http://weather.cod.edu/notes/fous.html, pp. 1-4.
How to Use E-Weather, http://www.fra.cas.psu.edu/tutewdis.htm, pp. 1-2.
National Weather Service—Northeast Metro Area Experimental Graphical Forecast, http://webdev1.weather.gov/forecasts/graphical/sectors/nemetro.php, pp. 1-6.
Enhancing Weather Information with Probability Forecasts, http://www.ametsoc.org/policy/enhancingwxprob_final.html, pp. 1-3.

* cited by examiner

SYSTEM AND METHOD FOR FORECASTING PROBABILITY OF PRECIPITATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of Invention

The present invention relates to systems for forecasting and communicating meteorological information, and in particular, to systems for producing multi-period probability of precipitation (POP) forecasts and disseminating the same through communications channels including, but not limited to the Internet, wireless devices, and broadcast systems.

2. Description of the Prior Art

The present invention was developed primarily in response to the need for enhanced weather information based on probability forecasts, a need recognized by members of The American Meteorological Society (AMS) in a 2002 Statement.

According to the AMS, weather forecasts have improved dramatically over the past two decades. In fact, forecasts produced by operational forecasters using meteorological observation data and forecasts produced by numerical models have become more accurate for nearly all weather elements and for most time and space scales of interest. Those forecasts contribute important information to decision makers and are valuable to a multitude of users, including the general public, the military, aircraft operators, businesses, and emergency managers, to name a few.

Progress has also been observed in developing accurate probability forecasts, which have a significant economic benefit because a sizable portion of the U.S. economy is weather sensitive. That progress has been important because POP forecasts (the percentage chance that a measurable amount of precipitation (at least 0.01 inches of rain or ice or 0.1 inches of snow) will fall at a specific location during a specific time period) are well accepted by many end users, including the general public.

Probability forecasts also have several benefits over categorical forecasts. One benefit is that they contain more information: the uncertainty in the forecast is expressed as part of the forecast. Thus, the end user is made aware of the uncertainty in the forecast and can use that additional information in making decisions. However, not all end users understand the information provided by probability forecasts or the meteorological event being represented by the forecasts. In its simplest terms, most people understand what is meant by the probability of an event occurring, such as the probability of obtaining "heads" when flipping a coin. What is significantly less intuitive to end users of POP forecasts is what is meant by a forecast that says "there is a 30% POP for State College, Pa., tomorrow." Often, that forecast is interpreted ostensibly as meaning that it will rain over 30% of the State College, Pa., area tomorrow or there is a 30% chance it will rain somewhere in the immediate region tomorrow. Other combinations of those and other interpretations are also likely. Thus, while quantitative precipitation forecasts have become more accurate, have advantages over categorical forecasts, are generally accepted by the general public, and are relatively simple in terms of the information provided, they are, by their very nature, rather complex.

To simplify the complexity, according to the AMS, a POP forecast should provide a probability of any desired amount, say 0.5 to 1.0 inches of precipitation, for any desired time interval. Until the present invention, POP forecasts have been issued for periods of 24, 12 or six hours, starting at a preset, fixed time, such as 7 am, and this time would not change dynamically. Those intervals are too long to provide sufficient detail as to when precipitation might occur and when it is most likely to occur. Shorter intervals, such as three hours, would be significantly better in terms of accuracy. The problem with shorter intervals, however, is that simply dividing the longer period into shorter intervals can result in inaccurate or even meaningless forecasts. For example, given a probability of precipitation for a 6-hour period (POP-6) of 60%, simply dividing the POP-6 hours into two three-hour intervals and calculating POP-3 values based on the data for those hours may not accurately represent the probability of forecast for the two intervals. In fact, as the time interval for the POP gets shorter, eventually it becomes physically impossible to have enough precipitation fall to qualify under the definition of a measurable amount. A more robust computational method is needed to generate accurate probability of precipitation values for periods shorter than 6 hours.

Another problem with current systems is that once the preset starting time for a period has passed (i.e., the starting time for the POP for the two 12-hour periods beginning at 7 am-7 pm), the POP time periods would not move with the clock. That means that at, for example, 9 am, the POP forecast available would be for the 7 am-7 pm period (or possibly the remainder of that period) and for 7 pm-7 am, rather than 9 am-9 pm and 9 pm-9 am time periods. Further, once 0.01 inch of precipitation has fallen, the probability of precipitation would by definition be 100% for the period. Thus, a probability of precipitation that does not reset every hour during precipitation would tell the user nothing about the future weather, and would therefore be of no value. In addition, a probability of precipitation that is less than 100% and does not reset during precipitation, would be inconsistent with the weather that has occurred and the definition of POP, and therefore inaccurate and confusing. Accordingly, probability of precipitation forecasts that reset to the present time would also be better in terms of accuracy and usefulness.

U.S. Pat. No. 6,424,917, for example, discloses a system and method for spatial synoptic classification using "sliding seed days" as model inputs rather than fixed time periods. That method is disclosed as being advantageous in terms of forecasting synoptic conditions.

To also simplify the complexity of probability forecasts, according to the AMS, there should be new ways for displaying and communicating the probabilistic information compared to those presently available. The National Weather Service (NWS), operating under the auspices of the National Oceanic and Atmospheric Administration (NOAA), has recently been experimenting with communicating probability forecast information to various interested parties. Called a graphical forecast, the NWS chose a graphical (map) approach for displaying information on its web site that may be accessed over the Internet. The information available for displaying is generated and maintained in NOAA's National Digital Forecast Database, and includes POP-12 data (the percentage chance that a measurable amount of precipitation (at least 0.01 inches of rain or ice or 0.1 inches of snow) will fall at a specific location during a 12-hour time period). However, even on the NWS's "Experimental Products" web site, they do not offer any POP forecasts for less than 6 hours nor do they offer any POP forecasts that are not for pre-set, non-rolling time periods.

Commercial companies also use their web pages for providing weather-related information, but other communication channels have also been used, such as electronic mail over the Internet and facsimile, as in the case of "E-Weather," which is provided to users by SkyBit, Inc. The "E-Weather" data may be in the form of a table array (3-hour time period increments along the top of the table and weather parameters (e.g., temperature, humidity, POP-6, etc.) along the left edge of the table). It is significant to note that even in this table array, although most data is presented in 3-hour increments, the POP forecasts are presented in 6 hour increments. U.S. Pat. No. 6,654,689 discloses methods of providing meteorological data (storm warnings) that include using a server connected to the Internet (or another network) for providing web-based text and images to a client's computer, uploading the same information directly to a third party's web site, sending the data via a pager or phone, and communicating the data and other information through broadcast systems (television or satellite). As discussed in U.S. Pat. No. 6,498,987, advances in computer connectivity technology available in most locations have allowed advances in communicating weather information to end users via the Internet by using web pages maintained on servers connected to the Internet and operated by various communications companies, such as local television and radio companies.

Before any information may be communicated to an end user, however, the appropriate probability forecast information must be determined. Systems and methods for generating the information are well known in the art. U.S. Patent Application Serial No. 2002/0114517A1, for example, discloses a short-term storm predictor system whereby meteorological image data from satellites or other sources is computer-processed to generate a 10- to 120-minute severe thunderstorm forecast (the raw data may be available, for example, from NOAA's NEXRAD network of radar systems). The results are communicated by a graphical representation of the event centered on the graph. Each pixel represents a location within a region and can be assessed a numerical value that represents, for example, the rate of precipitation. U.S. Pat. No. 6,128,578 also analyzes time-series changes in real-time radar images to forecast precipitation, the output being a graphical display having contoured and colored probability rings superimposed over a spatial region.

Although many features of the present invention are described in the prior art, none of the prior art patents are directed to a system specifically for providing location-specific, time-sliding (less than six-hour) probability of precipitation forecasts via the Internet. Moreover, the prior art do not contain any suggestion or motivation to calculate probability of precipitation values for time periods less than six hours or on a rolling time basis. There remains, therefore, the need for such a system to provide more accurate forecasts that may be used by decision makers planning activities that are weather sensitive.

SUMMARY OF THE INVENTION

A POP forecast provides the percentage chance that a measurable amount of precipitation (at least 0.01 inches of rain or ice or 0.1 inches of snow) will fall at a specific location during a specific time period. A "Trace" of precipitation is defined as a finite, non-zero amount of precipitation that falls, that is less than a measurable amount. A low POP means that there is a small chance of measurable precipitation; conversely, a high POP means the chance is greater. Once the forecast period has occurred, the actual POP will always be either 0% or 100%, i.e. either there was or was not a measurable amount of precipitation. However, this eventual outcome is not known with certainty in advance, which is why POP forecasts are typically a percentage between 0% and 100%. Although a POP forecast is the chance that measurable precipitation will occur, it does not indicate how light or heavy the precipitation might be. A POP-T forecast is a POP forecast where the time period interval is T hours (i.e., POP-3 is a three-hour POP forecast, a POP-4 is a four-hour forecast, etc.).

The preferred embodiment of the present invention is a multi-period POP-3 forecast that includes a prediction of the most probable amount of precipitation that may fall during each time period. The POP-3 values are based on POP-6 values that have already been computed.

The resulting POP-3 estimates are presented in alphanumeric and graphical means and communicated via a web page maintained on and generated by a server connected to the Internet. In the preferred embodiment, the presentation of forecast information is as follows. For each of selected time periods (e.g., the next three hours, the next six hours, the next 12 hours, the next 24 hours, the next 48 hours and the next 96 hours (i.e., four days)), a POP value, expressed in percent ranging from 0% to 100%, is provided along with a graphic in the form of a bar, the length of which conveys the probability value (i.e., the longer the bar, the higher the POP value). Next to the POP value and bar is a numerical value representing the most probable amount of precipitation that may fall during the time period, expressed in equivalent inches of water (i.e., rain, melted snow and ice combined). Information for the specific types of precipitation is also calculated and may be communicated in the same manner. This includes probability of precipitation, as well as probability of snow, probability of ice, probability of rain, probability of thunderstorms and probability of other events. Other information and indicia may also be presented in various other forms.

In the preferred embodiment, each of the selected time periods starts with the current hour, so a high POP-3 value in the next few hours will carry over into all the longer time periods. For example, if the POP-3 in the next three hours time period is 90, then the POP in the next 96-hour time period will be at least 90, even if there is no chance of precipitation after the first three hours of the period. To provide a better understanding of this, a time-series graph depicting when the precipitation will likely occur is also provided (by three-hour intervals). For each time period on the x-axis, a vertical bar is used to represent the POP value. Thus, the height of the bars visually conveys when the precipitation event is forecast to occur. Each POP-3 value is reset at the start of the next hour, so the forecast is provided on a rolling basis.

In one embodiment of the invention, POP-3 forecast values are calculated using algorithm models that combine POP-6 forecasts for multiple periods and the most probable forecast hourly precipitation amounts. In those algorithms, POP-6 values are compared, and based upon their relationship to each other and the time period in question of less than 6 hours, a value "A" is assigned. Next, the most probable precipitation amount for each hour in the time period in question and in the hours surrounding that time period are examined, and based upon their relationship, a value of "B" is assigned. Then, a POP for the time period in question is determined based upon the relationship between the "A" and the "B" values. The "A" and the "B" values may be calculated utilizing the output from computerized numerical forecast models and may be modified based upon current data from manual or sensor observations of current conditions, as well as data from radar and satellite systems. The values may also be calculated and modified manually.

Accordingly, it is a principal object of the present invention to provide location-specific short-term POP forecasts for less than six-hour time periods and preferably for three-hour time periods.

It is another object of the present invention to provide location-specific short-term POP forecasts that are calculated for the current time period and on a rolling time-period basis thereafter.

It is still another object of the present invention to provide forecasts to end users via a communications channel, including, but not limited to wired, wireless and hardcopy channels such as a web page or e-mail on the Internet, a pager, telephony (voice and/or data), broadcast, printed page, and personal data organizer, each of which may include a voice-activated interface.

It is another object of the present invention to provide a system for forecasting and providing POP information to interested persons who may be interested in monitoring POP forecasts via the Internet by logging onto a server through a client station and entering user-specific inputs such as location or region to obtain the desired information.

It is still another object of the present invention to provide most probable precipitation amount forecasts for each hour in the time period in question.

It is another object of the present invention to provide probability forecasts for each different type of precipitation, including rain, snow, ice and thunderstorms.

It is still another object of the present invention to provide most probable precipitation amounts for each different type of precipitation.

These and other objects and features of the present invention are accomplished as embodied and fully described herein by a system involving a network server; a database populated with meteorological data and forecast information contained on the network server or another computer system operatively connected to the network server; a forecast model that executes algorithms (which input the meteorological data and forecast information from the database and output probability forecast information); and a communications system that generates information for end users, and is preferably a web-page generating software device, such as a hypertext mark-up language (HTML) or other proprietary page generator for generating a user.

Other objects, features and advantages of the present invention will become evident to one skilled in the art from the following detailed description of the invention in conjunction with the referenced drawings.

BRIEF DESCRIPTION OF THE DRAWINGS

FIG. 2b is a continuation of the process flow diagram of FIG. 2a;

FIG. 2l is a continuation of the process flow diagram of FIG. 2k.

DETAILED DESCRIPTION OF THE INVENTION

Figure 1:
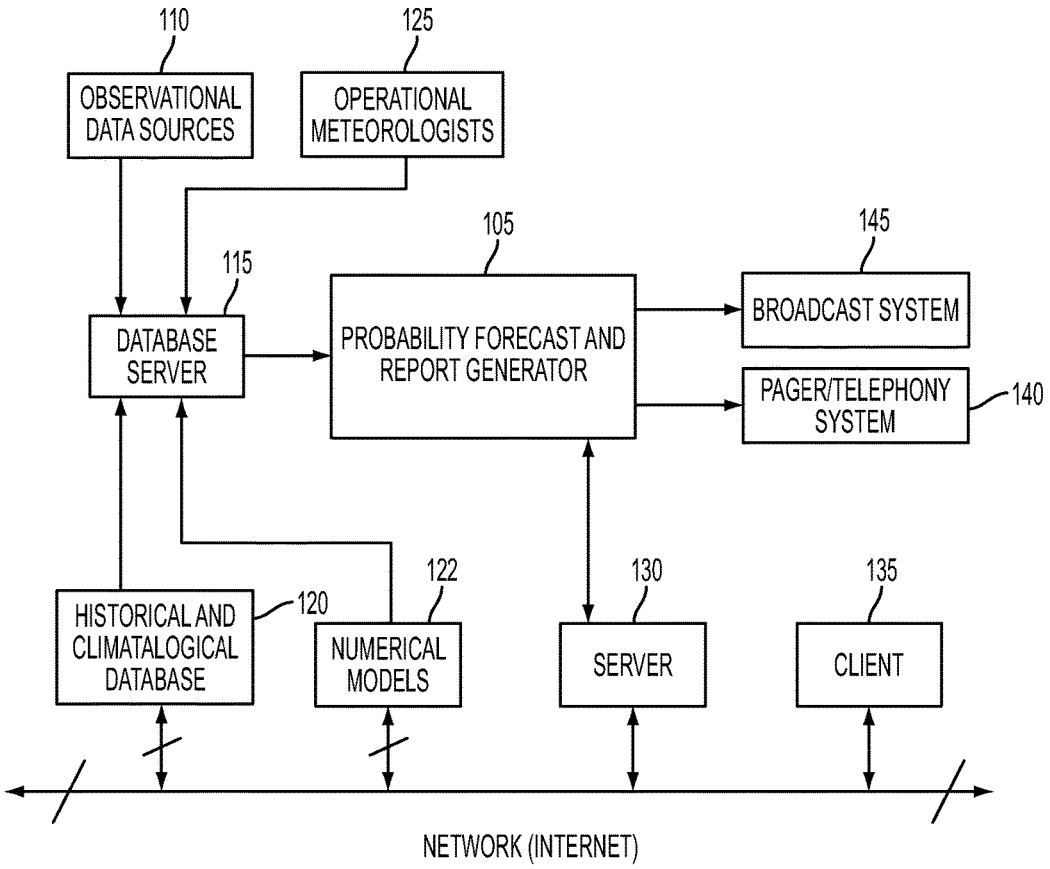
FIG. 1 is a schematic diagram of one embodiment of the system of the present invention.

In the present invention, several preferred embodiments are described for illustrative purposes. Referring first to FIG. 1, which is a schematic diagram of the preferred embodiment of the system of the present invention, there is shown a computer-assisted probability forecast and report generator 105 that generates POP-T forecasts. In the preferred embodiment of the invention, time period interval, T, is less than 6 hours. In the most preferred embodiment of the invention, T=3 hours. The probability forecast information is provided for the current time through a pre-set time period, t=12, 24, 48 and/or 96 hours. For each time period, a POP is calculated for each successive time period interval (i.e., for T=3, values for $POP\text{-}3_{(0-3)}$, $POP\text{-}3_{(3-6)}$, $POP\text{-}3_{(6-9)}$), . . . $POP\text{-}3_{(t-3\ to\ t)}$ are calculated).

The forecast generator 105 preferably receives inputs from database server 115, which contains a forecast database and which receives data and information from various external sources. Those sources may include, but are not limited to, current observational data source 110; historical and climatological database source 120; numerical model forecast source 122; and direct input 125 from operational forecast meteorologists.

The current observational data source 110 may be satellite, radar, automated and manual surface observation systems or any other systems that provide real-time or near real-time data and information. For example, NEXRAD radar data may be accessed and downloaded or telemetry from geosynchronous weather satellites may be collected and stored. The historical and climatological database source 120 includes data for various meteorological parameters and it may or may not be connected to a network. That is, the data may be input to database server 115 from a digital source, such as a magnetic tape, or entered manually from hard copy printouts. The numerical model forecast source 122 includes computer-generated forecasts created by atmospheric forecast models run by U.S. and/or foreign governments, as well as those run by private entities and universities, and it may or may not be connected to the network.

The forecast generator 105 produces POP forecast information and makes it available through a network server 130, which is connected to a network like the Internet and may create a web page. An end user may access the forecast information by logging onto the network server 130 through a client computer 135 connected to the Internet, or may receive the information via a pager or telephony system 140 or a broadcast system 145. Other channels of communication not expressly shown in FIG. 1 are also contemplated, including, but not limited to wired, wireless and hardcopy channels such as a web page or e-mail on the Internet, a pager, telephony (voice and/or data), broadcast, printed page, and personal data organizer, each of which may include a voice-activated interface.

The forecast generator 105 computes the POP values and the most probable precipitation amount values corresponding to each hour of the selected time period of interest, utilizing the artificial intelligence technique known as an expert system, which is designed to simulate the thought processes and the procedure that might be followed by an expert in determining these predictions, based upon the best available data. In this process, the expert might base the POP values on existing POP-6 values and forecast hourly precipitation amounts, which those having ordinary skill in the art will be familiar with and know how to estimate.

In the case of the preferred embodiment of the invention, a POP-6 is a six-hour POP that already exists in a digital forecast database that may reside in the same computer as the forecast generator 105 or it may reside in the database server 115 that is connected to the forecast generator 105. The POP-$6_C$ is the six-hour POP that contains at least the earliest part of POP-6 that already exists in the database (i.e., the current POP-6). POP-$6_{(C+1)}$ is the six-hour POP from the database for the six-hour period that immediately follows POP-$6_C$. POP-$6_{(C-1)}$ is the six-hour POP from the database that immediately precedes the POP-$6_C$.

Figure 2A:
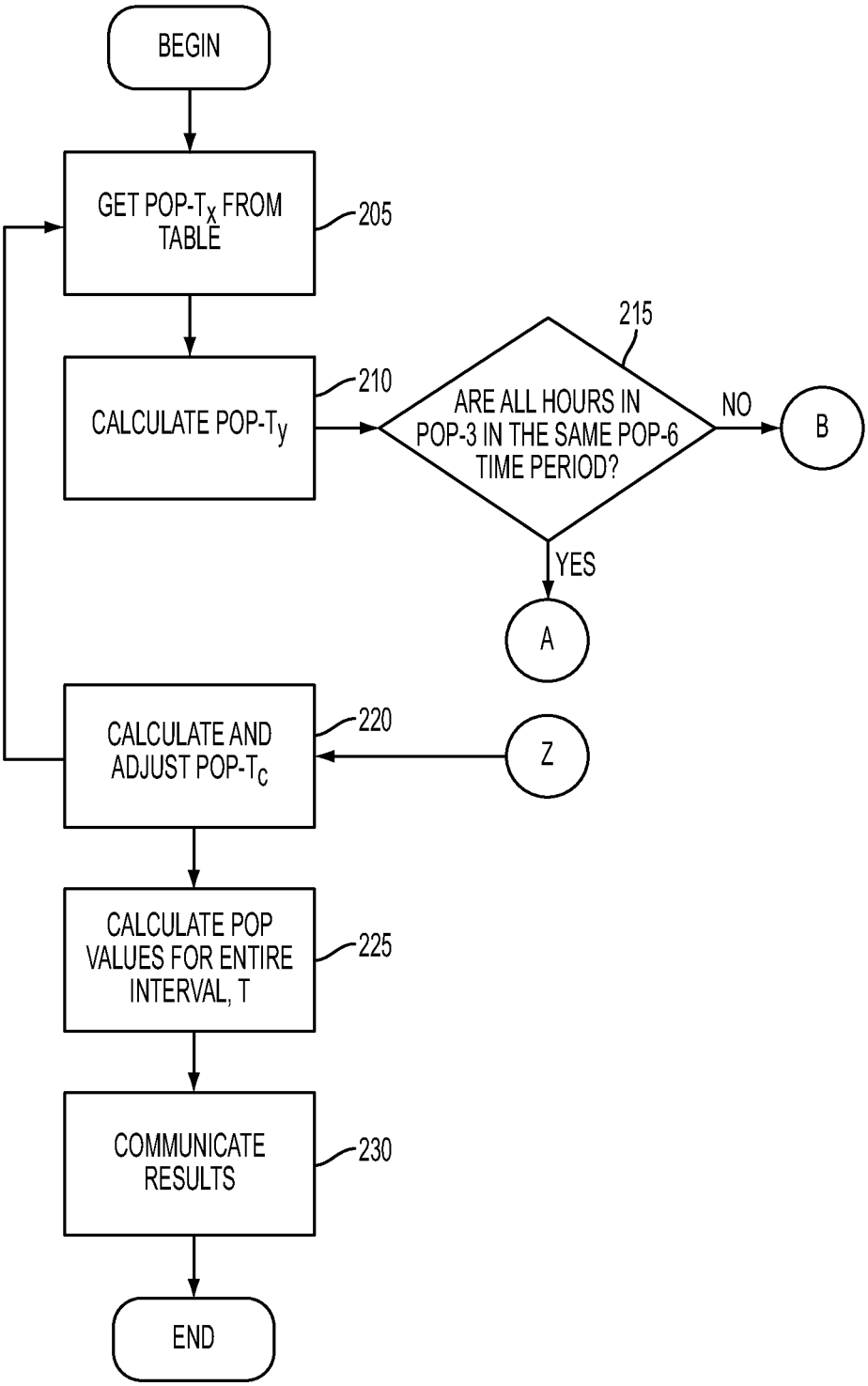
FIG. 2a is a process flow diagram of the invention.

Referring now to FIG. 2a, which is a process flow diagram of the present invention, the forecast generator 105 performs several basic steps as shown. First, in process step 205, a value for POP-$T_X$ for a particular time period is determined based upon the forecast precipitation amount for each hour in the period. In process step 210, a value for POP-$T_Y$ for a particular time period is computed based on the POPs for longer time periods using computations executed in module "A" or "B." Next, in process step 220, POP-$T_C$, the POP forecast value for this period, is set to the average of the POP-$T_X$ and POP-$T_Y$ values and then adjusted, as needed (as described later). Each successive POP-T value is also calculated (i.e., POP-$T_{(C+1)}$, POP-$T_{(C+2)}$, etc.). Then, based on the POP-T values for each interval, the six, 12, 24, 48 and 96 POP values are calculated in process step 225. Finally, the results are communicated to an end user in process step 230. This process can be used for precipitation or for any individual form of precipitation, such as rain, snow, ice or thunderstorms.

In the preferred embodiment of the invention, T=3 hours, so POP-3 values are computed. A POP-3 is the percentage chance that a measurable amount of precipitation (at least 0.01 inches of rain or ice or 0.1 inches of snow) will fall at a specific location during a three hour time period. In process step 205, an appropriate POP-$3_X$ value is obtained from the following table (where Tr=trace):

| | | Number of hours in the time period with a trace of precipitation | | | |
|---|---|---|---|---|---|
| POP-$3_X$ | | 0 | 1 | 2 | 3 |
| Number of hours | 0 | 10 | 40 | 45 | 50 |
| in the time period | 1 | 50 | 60 | 65 | — |
| where precipitation | 2 | 70 | 80 | — | — |
| is at least 0.01 inches | 3 | 90 | — | — | — |

The following example explains the concept of using the above table to select an appropriate POP-$3_X$ value. If there are no hours in the next three hours that have an hourly precipitation forecast of a trace amount and there are two hours in the next three hours where the hourly precipitation forecast is at least 0.01 inches, then, reading down column "0" to row "2" gives a value of 0.70 (i.e., 70%) for POP-$3_X$.

Still referring to FIG. 2a, values for POP-$3_Y$ are determined using one of two modules "A" or "B" that execute depending upon the answer to query step 215. Modules "A" and "B" are designed to simulate an intuitive analysis using artificial intelligence embodied in the algorithms of those modules. The problem that must be addressed is that a POP-6 represents a value for a six-hour time period (hours 1-6) and we are interested in obtaining a three-hour time period sub-set within those six hours (or a three-hour time period that straddles two POP-6 six hour time periods). For example, in its simplest terms, if POP-6 is 60% for hours 0-6, what is the POP-3 for the three-hour interval for hours 0-3 and the three-hour interval for hours 3-6. The POP-$3_Y$ values are determined by looking at the POP-6 values and the hourly precipitation amounts for the six-hour time period. If, for example, POP-$6_{(C-1)}$ is 90% and POP-$6_{(C+1)}$ is zero, then POP-$3_C$ is logically somewhere between zero and 90%. If the precipitation forecasts suggest that measurable precipitation will occur during the first three hours of the POP-$6_{(C+1)}$ time period, the value for POP-$3_C$ may be closer to the 90% value. The specific method for estimating the POP-$3_Y$ values from POP-6 data are illustrated below by reference to the accompanying figures.

Still referring to FIG. 2a, query step 215 requires a determination of whether all the hours in POP-3 are in the same POP-6 time period. The answer to that query would be "No" if hour 1 of POP-3, for example, corresponds to hour 6 of POP-$6_C$ but hours 2-3 of POP-3 correspond to hours 1 and 2, respectively, of POP-$6_{(C+1)}$. POP-6 and hourly precipitation forecast values for the location of interest are stored in database server 115 (FIG. 1) and are previously calculated by methods well known in the art.

Figure 2B:
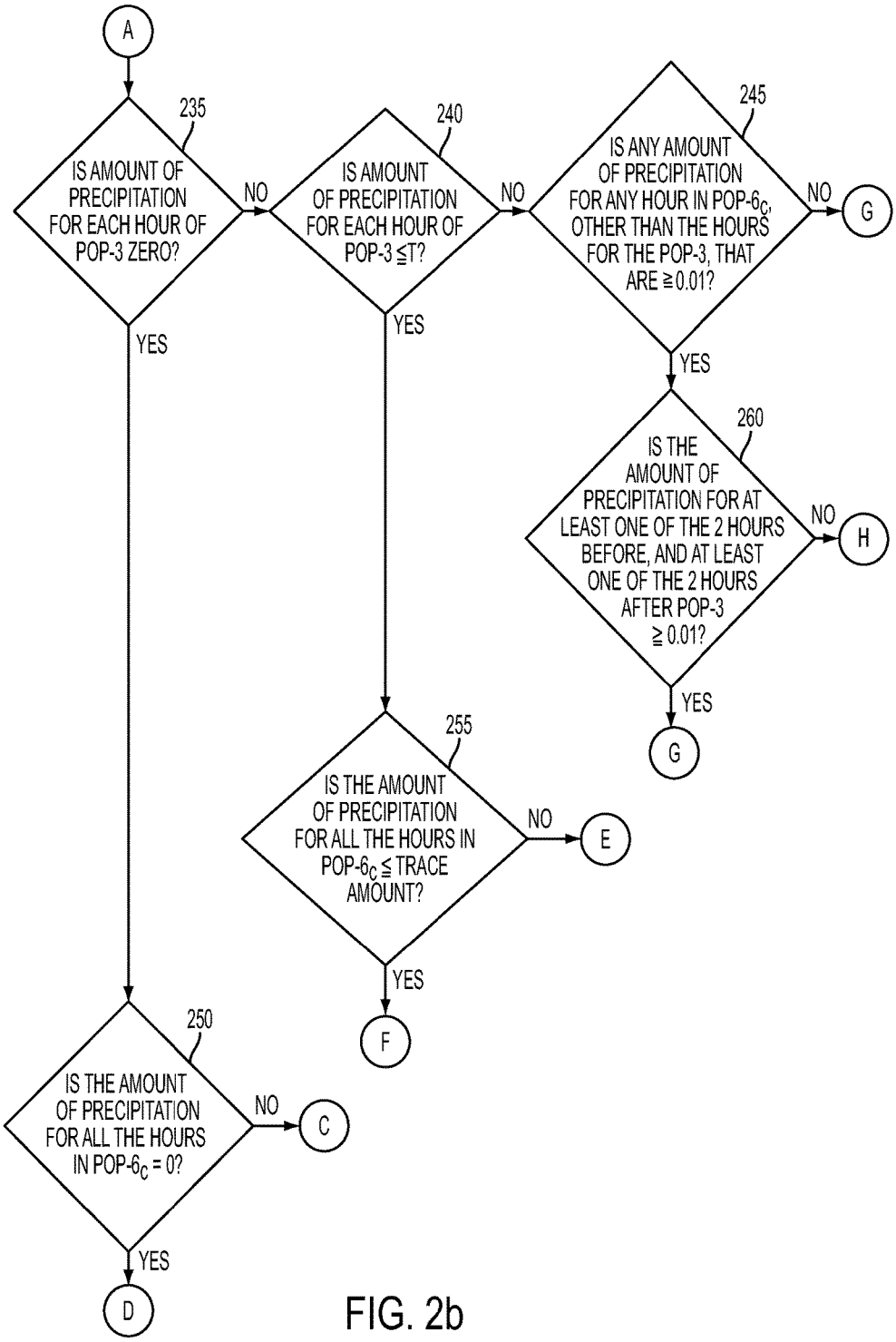

Referring now to FIG. 2b, which represents computation module "A," query step 235 requires a determination of whether the amount of precipitation for each hour of POP-3 is equal to zero. Query step 240 requires a determination of whether the amount of precipitation for each hour in POP-3 is less than or equal to T. Query step 245 requires a determination of whether there is any amount of precipitation for any hour in POP-$6_C$, other than the hours for the POP-3 time period, that is greater than or equal to 0.01. Query step 250 requires a determination of whether the amount of precipitation for all the hours in POP-$6_C$ is equal to zero. Query step 255 requires a determination of whether the amount of precipitation for all the hours in POP-$6_C$ is less than or equal to a trace amount. Query step 260 requires a determination of whether the amount of precipitation for at least one of the two hours before and at least one of the two hours after POP-3 is greater than or equal to 0.01 inches. Depending on the answers to those queries, as shown in FIG. 2b, different modules of the forecast generator 105 will be executed as discussed below.

Figure 2C:
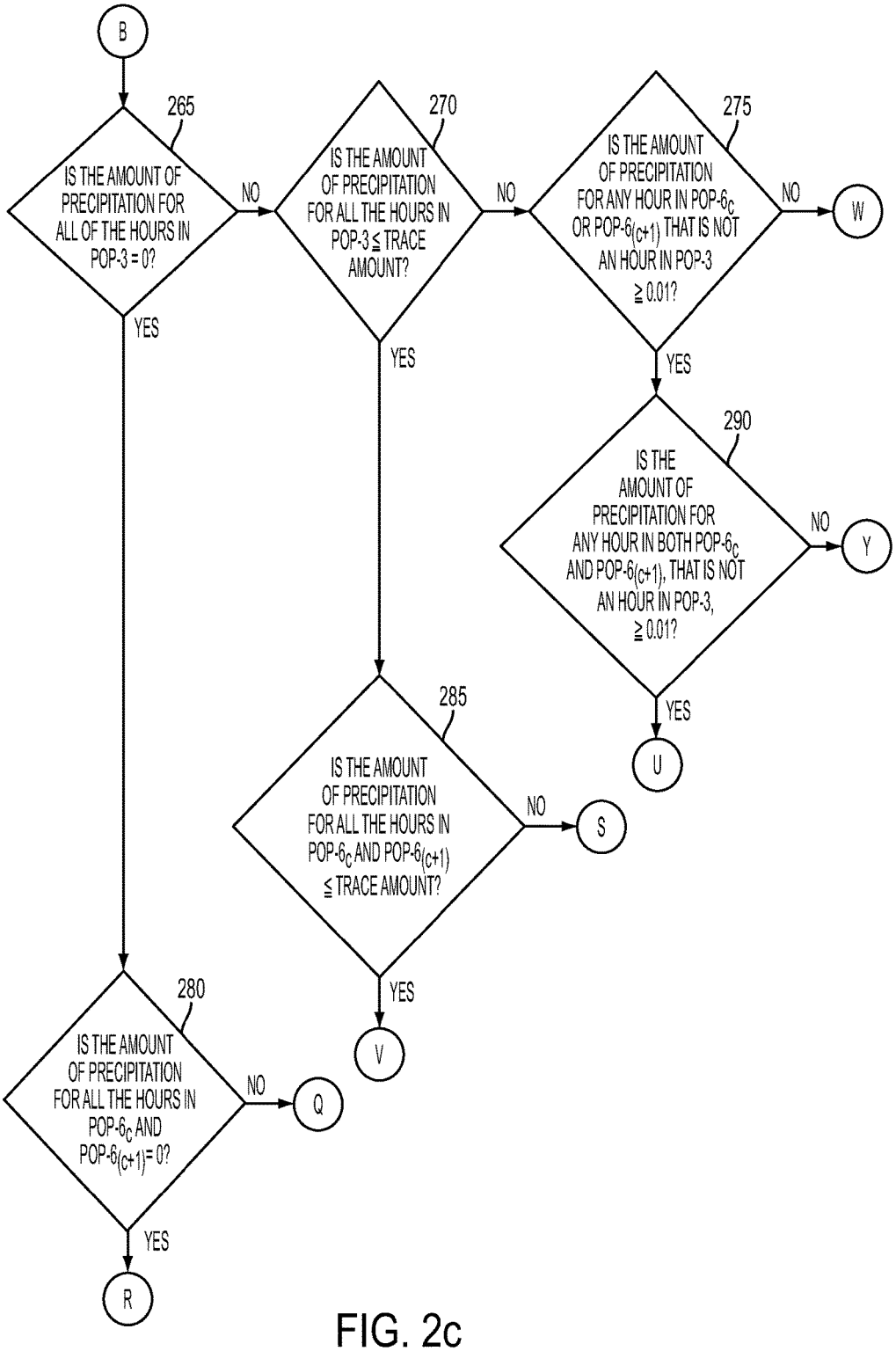
FIG. 2c is a continuation of the process flow diagram of FIG. 2b.

In FIG. 2c, which represents module "B," query step 265 requires a determination of whether the amount of precipitation for all of the hours in POP-3 is equal to zero. Query step 270 requires a determination of whether the amount of precipitation for all the hours in POP-3 is less than or equal to a trace amount. Query step 275 requires a determination of whether the amount of precipitation for any hour in POP-$6_C$ or POP-$6_{(C+1)}$, that is also not an hour in POP-3, that is greater than or equal to 0.01 inches. Query step 280 requires a determination of whether the amount of precipitation for all the hours in POP-$6_C$ and POP-$6_{(C+1)}$ is equal to zero. Query step 285 requires a determination of whether the amount of precipitation for all the hours in POP-$6_C$ and POP-$6_{(C+1)}$ is less than or equal to a trace amount. Query step 290 requires a determination of whether the amount of precipitation for any hour in both POP-$6_C$ and POP-$6_{(C+1)}$, that is not an hour in POP-3, that is greater than or equal to 0.01 inches. Depending on the answers to those queries, as shown in FIG. 2c, different modules of the forecast generator 105 will be executed as discussed below.

Figure 2D:
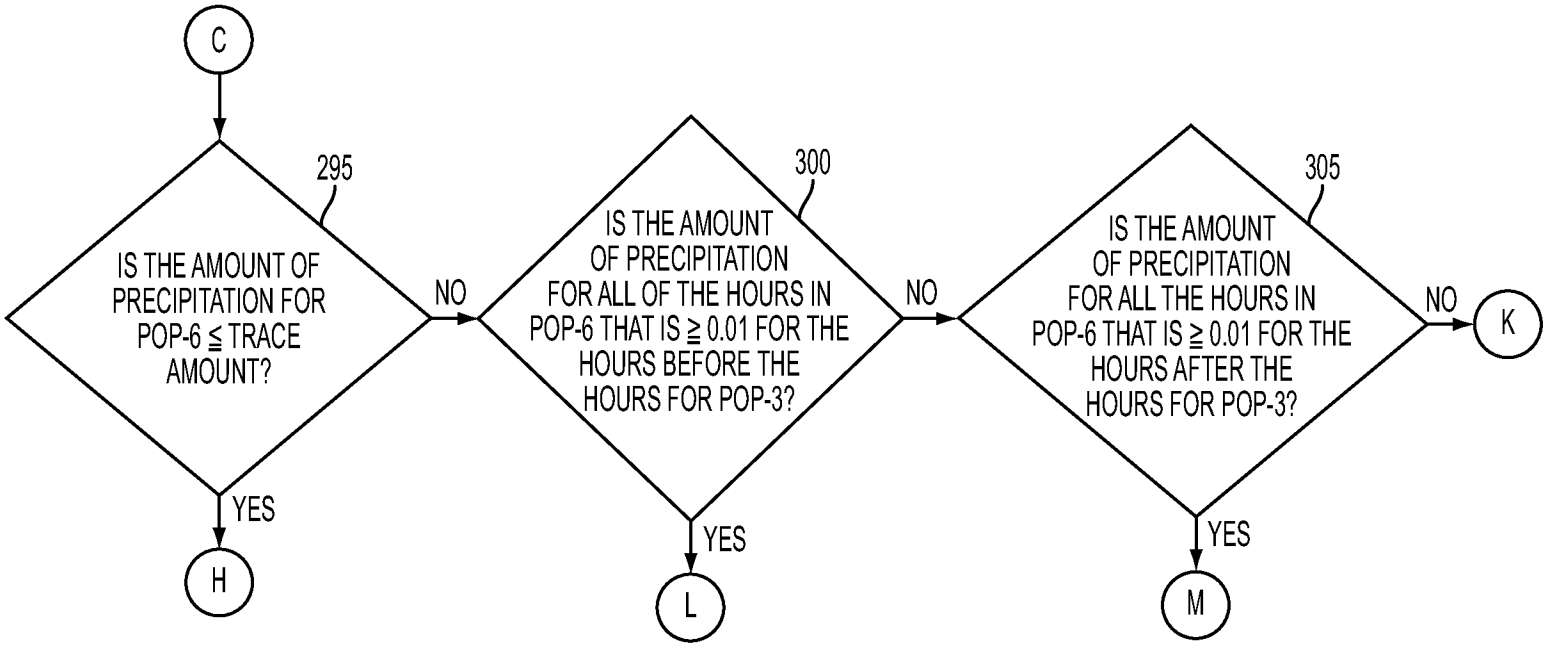
FIG. 2d is a continuation of the process flow diagram of FIG. 2c.

Next, in FIG. 2d, which represents module "C," query step 295 requires a determination of whether the amount of precipitation for POP-$6_C$ is less than or equal to a trace amount. Query step 300 requires a determination of whether the amount of precipitation for all of the hours in POP-6 that is greater than or equal to 0.01 inches is for the hours before the hours for POP-3. Query step 305 requires a determination of whether the amount of precipitation for all the hours in POP-6 that is greater than or equal to 0.01 inches is for the hours after the hours for POP-3. Depending on the answers to those queries, as shown in FIG. 2d, different modules of the forecast generator 105 will be executed as discussed below.

Figure 2E:
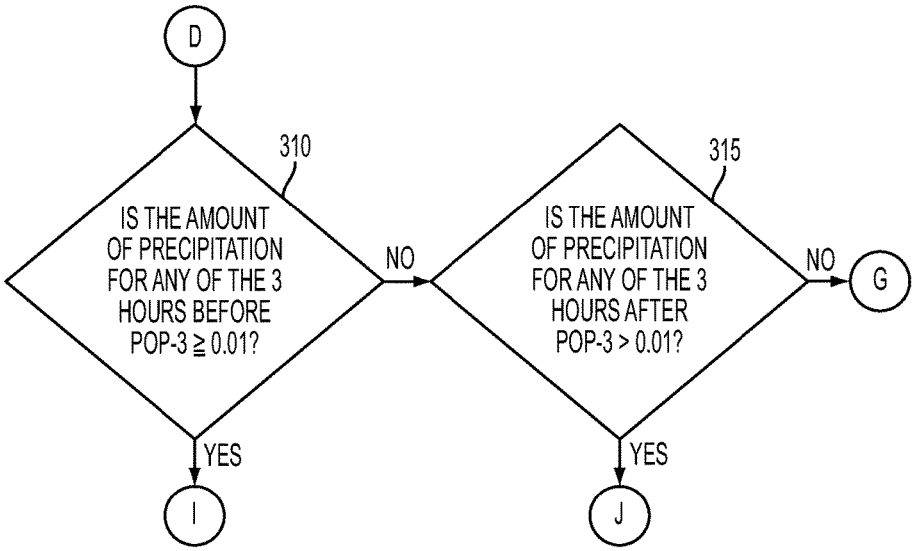
FIG. 2e is a continuation of the process flow diagram of FIG. 2d.

Next, in FIG. 2e, which represents module "D," query step 310 requires a determination of whether the amount of precipitation for any of the three hours before POP-3 is greater than or equal to 0.01 inches. Query step 315 requires a determination of whether the amount of precipitation for any of the three hours after POP-3 is greater than 0.01 inches. Depending on the answers to those queries, as shown in FIG. 2e, different modules of the forecast generator 105 will be executed as discussed below.

Figure 2F:
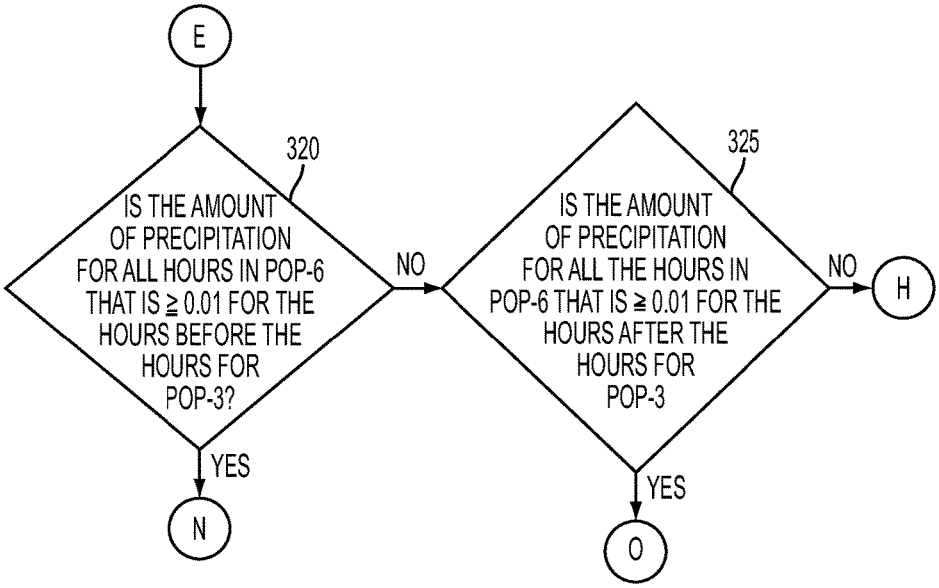
FIG. 2f is a continuation of the process flow diagram of FIG. 2e.

In FIG. 2f, which represents module "E," query step 320 requires a determination of whether the amount of precipitation for all the hours in POP-6 that is greater than or equal to 0.01 inches are for hours before the hours for POP-3. Query step 325 requires a determination of whether the amount of precipitation for all the hours in POP-6 that is greater than or equal to 0.01 inches is for hours that are after the hours for POP-3. Depending on the answers to those queries, as shown in FIG. 2f, different modules of the forecast generator 105 will be executed as discussed below.

Figure 2G:
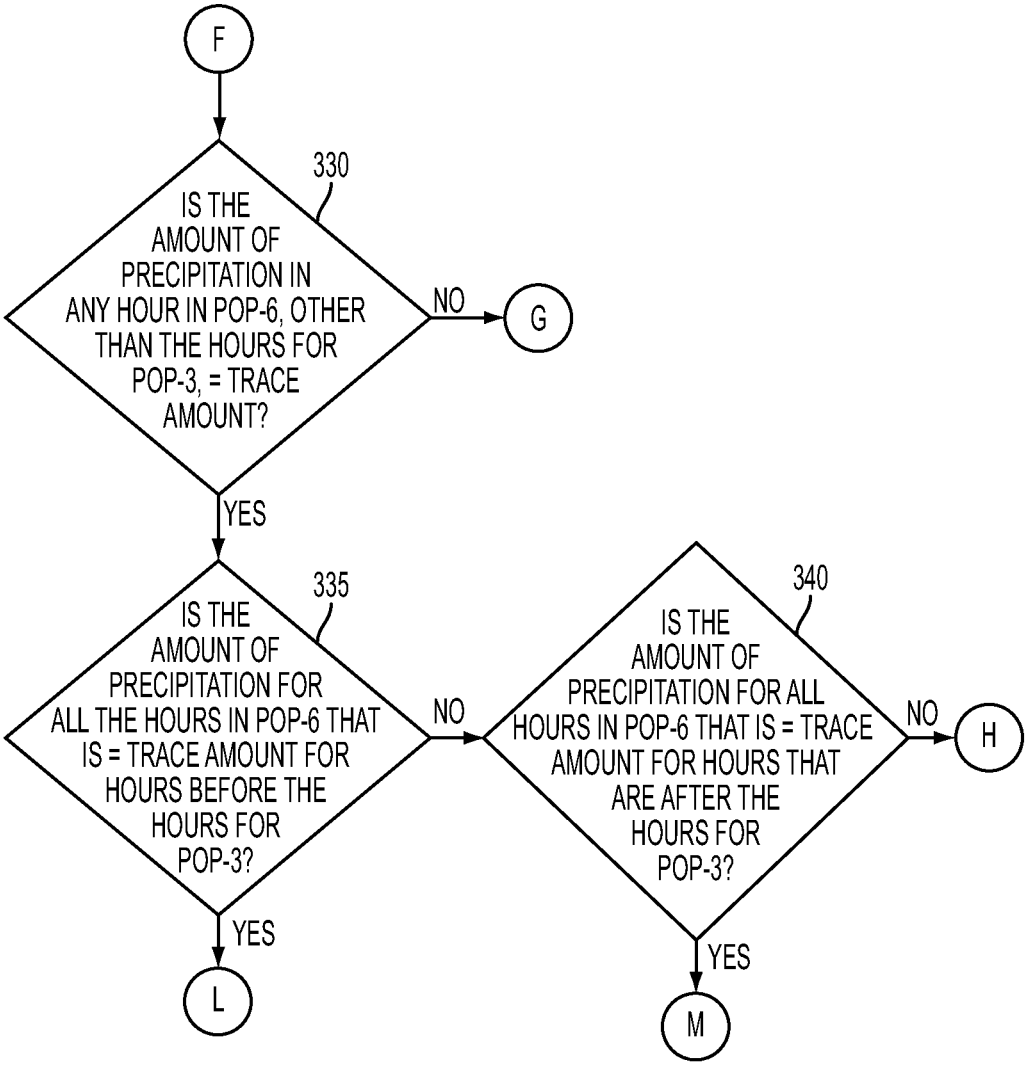
FIG. 2g is a continuation of the process flow diagram of FIG. 2f.

Next, in FIG. 2g, which represents module "F," query step 330 requires a determination of whether the amount of precipitation in any hours in POP-6, other than the hours for POP-3, are equal to a trace amount. Query step 335 requires a determination of whether the amount of precipitation for all the hours in POP-6 that is equal to a trace amount are for hours before the hours for POP-3. Query step 340 requires a determination of whether the amount of precipitation for all the hours in POP-6 that is equal to a trace amount is for hours that are after the hours for POP-3. Depending on the answers to those queries, as shown in FIG. 2g, different modules of the forecast generator 105 will be executed as discussed below.

Figure 2H:
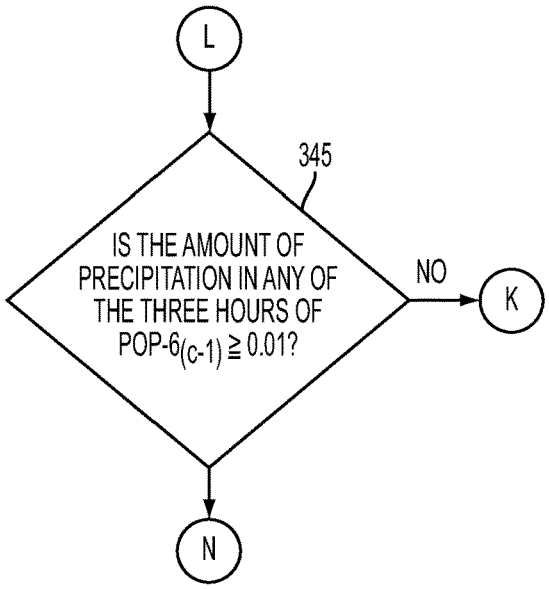
FIG. 2h is a continuation of the process flow diagram of FIG. 2g.
Figure 2I:
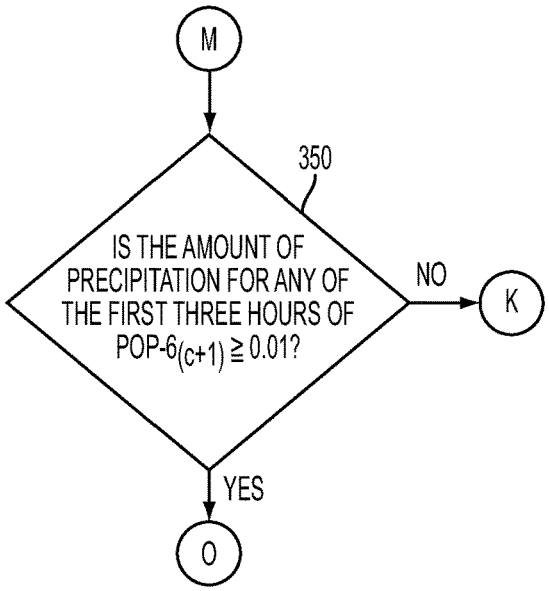
FIG. 2i is a continuation of the process flow diagram of FIG. 2h.

In FIG. 2h and FIG. 2i, which represents modules "L" and "M," respectively, query step 345 requires a determination of whether the amount of precipitation in any of the last three hours of POP-$6_{(C-1)}$ is greater than or equal to 0.01 inches. Query step 350 requires a determination of whether the amount of precipitation for any of the first three hours of POP-$6_{(C+1)}$ is greater than or equal to 0.01 inches. Depending on the answers to those queries, different modules of the forecast generator 105 will be executed as discussed below.

Figure 2J:
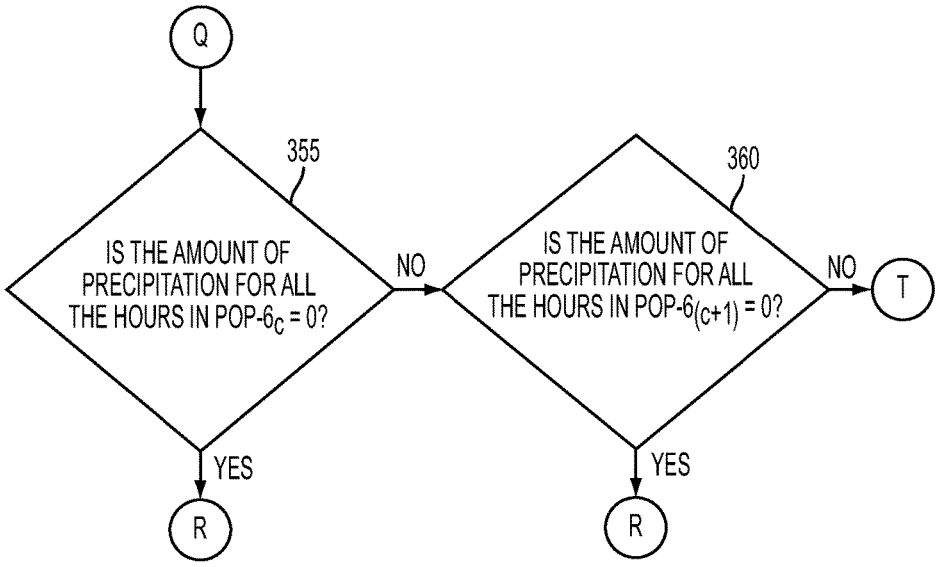
FIG. 2j is a continuation of the process flow diagram of FIG. 2i.

Next, in FIG. 2j, which represents module "Q," query step 355 requires a determination of whether the amount of precipitation for all the hours in POP-$6_C$ is equal to zero. Query step 360 requires a determination of whether the amount of precipitation for all the hours in POP-$6_{(C+1)}$ is equal to zero. Depending on the answers to those queries, different modules of the forecast generator 105 will be executed as discussed below.

Figure 2K:
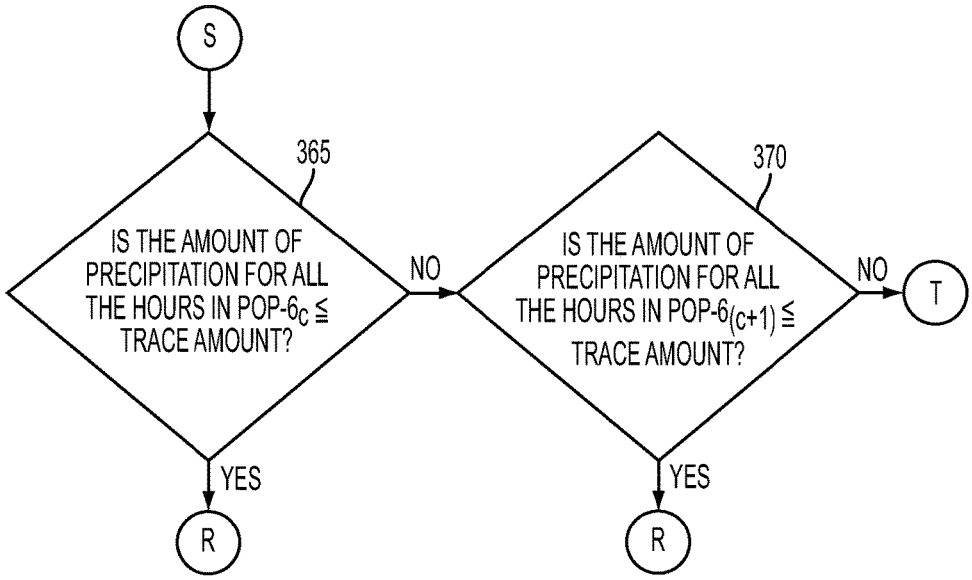
FIG. 2k is a continuation of the process flow diagram of FIG. 2j.
Figure 2I:
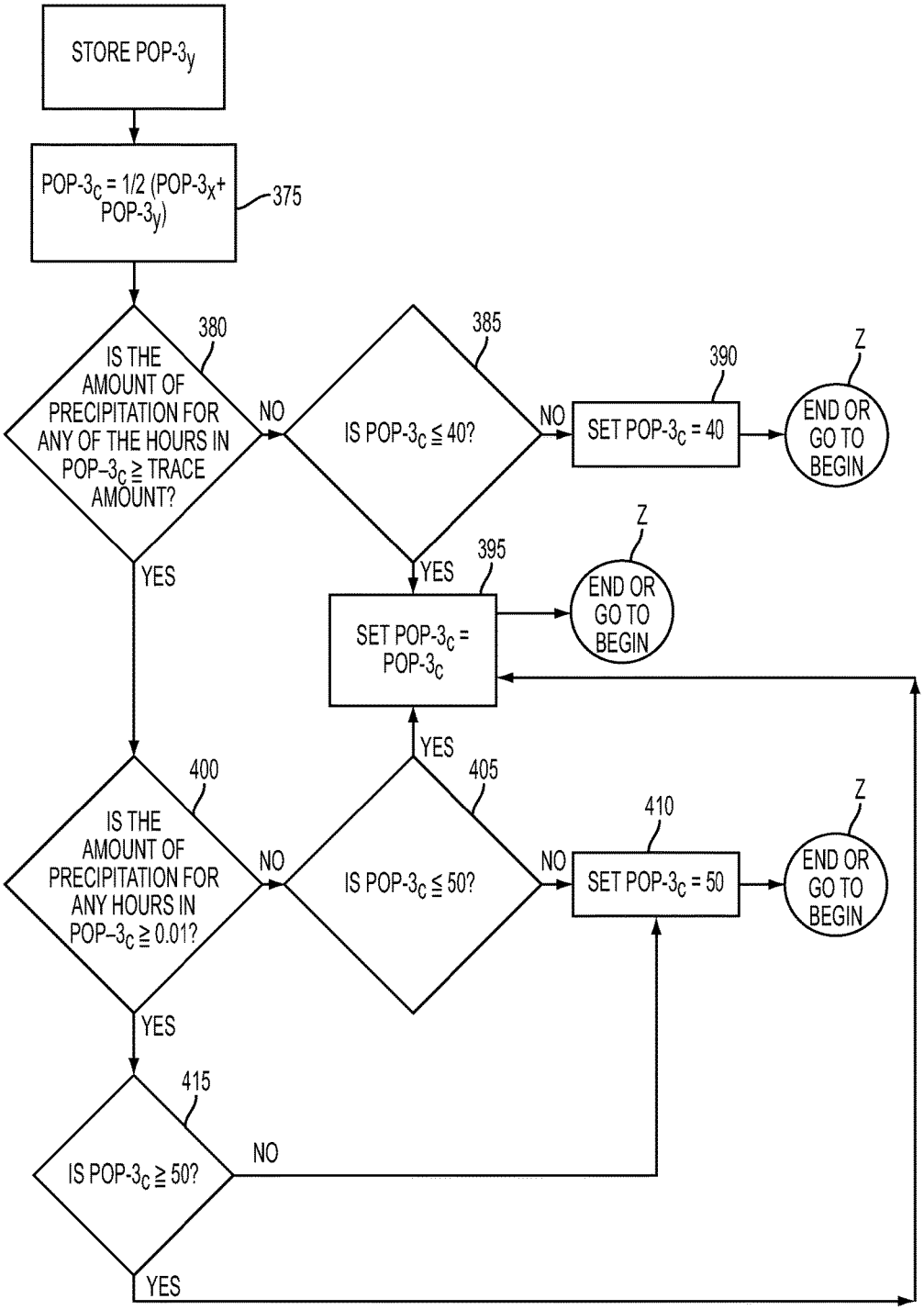

In FIG. 2k, which represents module "S," query step 365 requires a determination of whether the amount of precipitation for all the hours in POP-$6_C$ is less than or equal to a trace amount. Query step 370 requires a determination of whether the amount of precipitation for all of the hours in POP-$6_{(C+1)}$ is less than or equal to a trace amount. Depending on the answers to those queries, different modules of the forecast generator 105 will be executed as discussed below.

Referring to FIGS. 2a-2k, the following table lists the values assigned to the variable POP-$3_Y$ after executing one or more of the previous modules.

| Module | POP-$3_Y$ |
|---|---|
| G | 0.9 * POP-$6_C$ |
| H | 0.8 * POP-$6_C$ |
| I | (0.5 * POP-$6_C$) + (0.4 * POP-$6_{(C-1)}$) |
| J | (0.5 * POP-$6_C$) + (0.4 * POP-$6_{(C+1)}$) |
| K | 0.7 * POP-$6_C$ |
| N | (0.6 * POP-$6_C$) + (0.2 * POP-$6_{(C-1)}$) |
| O | (0.6 * POP-$6_C$) + (0.2 * POP-$6_{(C+1)}$) |
| W | 0.9 * max (POP-$6_C$, POP-$6_{(C+1)}$) |
| V | 0.8 * max (POP-$6_C$, POP-$6_{(C+1)}$) |
| U | max (0.45 * (POP-$6_C$ + POP-$6_{(C+1)}$), 0.8 * max(POP-$6_C$ + POP-$6_{(C+1)}$)) |
| R | (0.4 * POP-$6_C$) + (0.4 * POP-$6_{(C+1)}$) |
| T | (0.3 * POP-$6_C$) + (0.3 * POP-$6_{(C+1)}$) |

As shown in the table above, the generalized formula for POP-$3_Y$ is as follows, for modules G, H, J, K, 0, R and T:

$$\text{POP-}3_Y = a*(\text{POP-}6_C) + b*(\text{POP-}6_{(C+1)}) \quad \text{(I)}$$

Where: $0 \le a \le 1$ and $0 \le b \le 1$. For modules I and N, the generalized formula for POP-$3_Y$ is as follows:

$$\text{POP-}3_Y = a*(\text{POP-}6_C) + b*(\text{POP-}6_{(C-1)}) \quad \text{(II)}$$

Where: $0 \le a \le 1$ and $0 \le b \le 1$. For modules W and V, the generalized formula for POP-$3_Y$ is as follows:

$$\text{POP-}3_Y = a*\max(\text{POP-}6_C, \text{POP-}6_{(C-1)}) \quad \text{(III)}$$

Where: $0 \le a \le 1$.

Once POP-$3_Y$ is known, the forecast generator 105 executes the routine shown in FIG. 21 (i.e., process step 220 shown in FIG. 2a). In process step 375, POP-$3_C$ is calculated using the following relationship:

$$\text{POP-}3_C = \tfrac{1}{2}(\text{POP-}3_X + \text{POP-}3_Y)$$

Where POP-$3_C$ is the three-hour POP for the current time period (i.e., hours 0-3) beginning with the current hour. Values for POP-$3_C$ are adjusted, as necessary, in order to make the resulting POPs consistent with the definition of POP. If, for example, the calculated value for POP-$3_Y$ using one of the modules from the table above is 30% but the hourly precipitation forecast data indicates there will be precipitation in one of the three hours of the time period, the probability of precipitation must be at least 50% for the POP time period.

Query step 380 requires a determination of whether the amount of precipitation for any of the hours in POP-$3_C$ are greater than or equal to a trace amount. Query step 385 requires a determination of whether POP-$3_C$ is less than or equal to 40. Query step 400 requires a determination of whether the amount of precipitation for any hours in POP-$3_C$ is greater than or equal to 0.01 inches. Query step 405 requires a determination of whether POP-$3_C$ is less than or equal to 50. Query step 415 requires a determination of whether POP-$3_C$ is greater than or equal to 50.

Depending upon the answers to the above queries, process step 390 assigns a value of 40 to POP-$3_C$, process step 395 assigns the current value of POP-$3_C$ to the variable POP-$3_C$ and process step 410 assigns a value of 50 to POP-$3_C$. Thus, the value for POP-$3_C$ is equal to 40, 50 or the current calculated value for POP-$3_C$.

Referring back to FIG. 2a, when the routine is finished for the first time period $T_C$, the calculations are repeated for each subsequent consecutive time periods. Thus, there will be 32 values for POP-$3_X$ and POP-$3_Y$ and POP-$3_C$ for a 96-hour period, which leads to 32 values for POP-3, one for each of the 32 three-hour periods. In process step 225, POP values for each interval of interest are determined (i.e., POP-6, POP-12, POP-24, POP-48 and POP-96, or others). To do this, each consecutive pairs of POP values are combined (e.g., hours 0-3 and 3-6), which reduces the number of POP values from 32 to 16. Those values represent POP-6. Next, each consecutive pairs of POP-6 values are combined (e.g., hours 0-6 and 6-12.), which reduces the number of POP values to 8. This process is repeated to come up with a single POP-96 value. Combining two successive probability values is done according to the following formula:

If POP-$T_C$ is lower than POP-$T_{(C+1)}$, then POP-(2T)=1−(1−0.4*POP-$T_C$)*(1−POP-$T_{(C+)}$)

Otherwise, POP-(2T)=1−(1−POP-$T_C$)*(1−0.4*POP-$T_{(C+1)}$)

For example, where T=3 hours (so 2T=6 hours) and given values for POP-$3_C$=40 (i.e., hours 1-3) and POP-$3_{(C+1)}$=60 (i.e., hours 4-6):

POP-6=1−(1−0.4*0.4)*(1−0.6)

POP-6=0.664(i.e., 66%)

In the preferred embodiment, once the values for probability of precipitation and most probable precipitation amount have been computed for each three-hour time period, the values are made available to end users via the network server 130. That server generates and sends web page content through a network (i.e., the Internet) to a client computer where it is displayed on the client computer users' monitor as a web page. The information is preferably shown numerically and graphically for each of six time periods: T through T+3 (i.e., the next three hour time period); T through T+6 (i.e., the next six hour time period); T through T+12 (12 hour time period); T through T+24 (one day time period); T through T+48 (two day time period) and T through T+96 (four day time period). It is preferably also shown for each consecutive three-hour period from hour 0 through hour 96. Methods for generating web page content and displaying data numerically and graphically are well known in the art, as are other methods for communicating the as identified herein.

Although this invention has been described in connection with specific embodiments, objects and purposes for the invention, it will be appreciated by one of skill in the art that various modifications of the invention, other than those discussed above, may be resorted to without departing from the nature and scope of the invention.

What is claimed is:

1. A system for calculating and communicating probability of precipitation forecasts for periods less than six hours using existing forecasting information, the system comprising:

storage means for storing location-specific probability forecasting information;

*a precipitation forecasting system including* processing means for computing a probability of precipitation value from the forecast information for any time period interval, T, in a pre-set time period, t, *wherein the precipitation forecasting system uses artificial intelligence to compute probability of precipitation values for time period intervals of length T in pre-set time periods of length t based on:*

*a number of time periods within the time period interval of length T wherein a forecasted precipitation amount is a trace amount;*

*a number of time periods within the time period interval of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t*; and a communications subsystem for communicating the *probability of precipitation* value via at least one communications channel, wherein T<6 hours and t≥6 hours.

2. The system according to claim 1, wherein T=3 hours and t=96 hours.

3. The system according to claim 1, wherein the probability of precipitation value [are] *is* not fixed to a specific time, but [are] *is* recalculated to a present time.

4. The system according to claim 1, further comprising manipulation means for allowing a system operator to manually adjust the probability of precipitation value [and the most probable precipitation amount value].

5. The system according to claim 1, wherein the storage means is a networked computer containing a digital database containing the *location-specific probability* forecasting information.

6. The system according to claim 1, wherein the processing means comprises a computer executing a probability forecast model.

7. The system according to claim 1, wherein the communications subsystem is a computer server connected to a network, and wherein the at least one communications channel comprises one or more web pages having the probability of precipitation value [and the most probable precipitation amount value] upon receiving a request from a remote client connected to the network.

8. The system according to claim 1, wherein the probability of precipitation forecast is [the] *a* current three-hour probability forecast value determined from:

½*(POP-$3_X$+POP-$3_Y$), where POP-$3_X$ is a value from between 10 and 90, inclusively, and POP-$3_Y$ is determined from the formula:

POP-$3_Y$=a*(POP-$6_C$)+b*(POP-$6_{(C+1)}$)

where: 0≤a≤1 and 0≤b≤1 and POP-$6_C$ is [the] *a* six-hour probability of precipitation forecast value for [the] *a* current six-hour time interval already stored in the storage means and POP-$6_{(C+1)}$ is [the] *a* next consecutive six-hour time interval also already stored in the storage means.

9. The system according to claim 1, wherein the probability of precipitation forecast is [the] *a* current three-hour probability forecast value determined from:

$$\tfrac{1}{2}*(\text{POP-}3_X+\text{POP-}3_Y),$$

where POP-$3_X$ is a value from between 10 and 90, inclusively, and POP-$3_Y$ is determined from the formula:

$$\text{POP-}3_Y=a*(\text{POP-}6_C)+b*(\text{POP-}6_{(C-1)})$$

where: $0 \le a \le 1$ and $0 \le b \le 1$ and POP-$6_C$ is [the] *a* six-hour probability of precipitation forecast value for [the] *a* current six-hour time interval already stored in the storage means and POP-$6_{(C-1)}$ is [the] *a* previous consecutive six-hour time interval also already stored in the storage means.

10. The system according to claim 1, wherein the probability of precipitation forecast is [the] *a* current three-hour probability forecast value determined from:

$$\tfrac{1}{2}*(\text{POP-}3_X+\text{POP-}3_Y),$$

where POP-$3_X$ is a value from between 10 and 90, inclusively, and POP-$3_Y$ is determined from the formula:

$$\text{POP-}3_Y=a*\max(\text{POP-}6_C,\text{POP-}6_{(C-1)})$$

where: $0 \le a \le 1$ and POP-$6_C$ is [the] *a* six-hour probability of precipitation forecast value for [the] *a* current six-hour time interval already stored in the storage means and POP-$6_{(C-1)}$ is [the] *a* previous consecutive six-hour time interval also already stored in the storage means.

11. The system according to claim 1, wherein in addition to the probability of precipitation forecast, also calculated are probability forecasts for specific types of precipitation[, including but not limited to, the] *selected from one of a* probability of rain, [the] *a* probability of snow, [the] *a* probability of ice, and [the] *a* probability of thunderstorms.

12. The system according to claim 1, wherein most probable precipitation amount values are calculated for some or all of the time period intervals T.

13. A system for calculating and communicating probability of precipitation forecasts for periods that are not fixed to specific pre-set times using existing forecasting information, the system comprising:

storage means for storing location-specific probability forecasting information;

*a precipitation forecasting system including* processing means for computing a probability of precipitation value from the forecast information for any time period interval, T, in a pre-set time period, t, *wherein the precipitation forecasting system uses artificial intelligence to compute probability of precipitation values for time period intervals of length T in the pre-set time periods of length t based on:*

*a number of time periods within the time period interval of length T wherein a forecasted precipitation amount is a trace amount;*

*a number of time periods within the time period interval of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t*; and a communications subsystem for communicating the *probability of precipitation* value via at least one communications channel, wherein the probability of precipitation value [are] *is* not fixed to a specific pre-set time, but [are] *is* recalculated to a present time.

14. The system according to claim 13, wherein T<6 hours and t≥6 hours.

15. The system according to claim 13, wherein T=3 hours and t=96 hours.

16. The system according to claim 13, further comprising manipulation means for allowing a system operator to manually adjust the probability of precipitation value [and the most probable precipitation amount value].

17. The system according to claim 13, wherein the processing means comprises a computer executing a probability forecast model.

18. The system according to claim 13, wherein the communications subsystem is a computer server connected to a network, and wherein the at least one communications channel comprises one or more web pages having the probability of precipitation value [and the most probable precipitation amount value] upon receiving a request from a remote client connected to the network.

19. The system according to claim 13, wherein the probability of precipitation forecast is [the] *a* current three-hour probability forecast value determined from:

$$\tfrac{1}{2}*(\text{POP-}3_X+\text{POP-}3_Y),$$

where POP-$3_X$ is a value from between 10 and 90, inclusively, and POP-$3_Y$ is determined from the formula:

$$\text{POP-}3_Y=a*(\text{POP-}6_C)+b*(\text{POP-}6_{(C+1)})$$

where: $0 \le a \le 1$ and $0 \le b \le 1$ and POP-$6_C$ is [the] *a* six-hour probability of precipitation forecast value for the current six-hour time interval already stored in the storage means and POP-$6_{(C+1)}$ is [the] *a* next consecutive six-hour time interval also already stored in the storage means.

20. The system according to claim 13, wherein the probability of precipitation forecast is [the] *a* current three-hour probability forecast value determined from:

$$\tfrac{1}{2}*(\text{POP-}3_X+\text{POP-}3_Y),$$

where POP-$3_X$ is a value from between 10 and 90, inclusively, and POP-$3_Y$ is determined from the formula:

$$\text{POP-}3_Y=a*(\text{POP-}6_C)+b*(\text{POP-}6_{(C-1)})$$

where: $0 \le a \le 1$ and $0 \le b \le 1$ and POP-$6_C$ is [the] *a* six-hour probability of precipitation forecast value for the current six-hour time interval already stored in the storage means and POP-$6_{(C-1)}$ is [the] *a* previous consecutive six-hour time interval also already stored in the storage means.

21. The system according to claim 13, wherein the probability of precipitation forecast is [the] *a* current three-hour probability forecast value determined from:

$$\tfrac{1}{2}*(\text{POP-}3_X+\text{POP-}3_Y),$$

where POP-$3_X$ is a value from between 10 and 90, inclusively, and POP-$3_Y$ is determined from the formula:

$$\text{POP-}3_Y=a*\max(\text{POP-}6_C,\text{POP-}6_{(C-1)})$$

where: $0 \le a \le 1$ and POP-$6_C$ is the six-hour probability of precipitation forecast value for the current six-hour time interval already stored in the storage means and POP-$6_{(C-1)}$ is the previous consecutive six-hour time interval also already stored in the storage means.

22. The system according to claim 13, wherein in addition to the probability of precipitation forecast, also calculated are probability forecasts for specific types of precipitation[, including but not limited to, the] *selected from one of a* probability of rain, [the] *a* probability of snow, [the] *a* probability of ice, and [the] *a* probability of thunderstorms.

23. The system according to claim 13, wherein most probable precipitation amount values are calculated for some or all of the time period intervals T.

24. A system for calculating and communicating probability of precipitation forecasts using existing forecasting information, the system comprising:

*a precipitation forecasting system including:* a probability of precipitation forecast model for computing a probability of precipitation value for a time interval, T, within a pre-set time period, t, wherein T<6 hours and t≥6 hours, *and wherein the probability of precipitation model uses artificial intelligence to compute probability of precipitation values for the time intervals of length T in pre-set time periods of length t based on:*

*a number of time periods within the time interval of length T wherein a forecasted precipitation amount is a trace amount;*

*a number of time periods within the time interval of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t;* a most probable precipitation amount forecast model for computing a precipitation amount value corresponding to each probability of precipitation value; and a communications device for communicating the *probability of precipitation and precipitation amount* values electronically to a remote requester.

25. The system according to claim 24, wherein T=3 hours and t=96 hours.

26. The system according to claim 24, wherein the probability of precipitation value [are] *is* not fixed to a specific time, but [are] *is* recalculated to the present time.

27. The system according to claim 24, wherein in addition to the probability of precipitation forecast, also calculated are probability forecasts for specific types of precipitation[, including but not limited to, the] *selected from one of a* probability of rain, [the] *a* probability of snow, [the] *a* probability of ice, and [the] *a* probability of thunderstorms.

28. The system according to claim 24, wherein the communications device is a network server connected to the Internet having a web page generator for sending web content in response to a request from a client computer connected to the Internet.

29. The system according to claim 24, wherein the communications device is one of a wired or wireless telephony system, a pager, radio or television broadcast system and a hardcopy printout.

30. A *computer-implemented* method of calculating probability of precipitation and most probable amount of precipitation forecasts for selected time periods and locations and communicating the same [to end users], comprising the steps of, *at a precipitation forecasting system*:

(a) storing probability of precipitation values from meteorological forecast models;

(b) calculating, *by the precipitation forecasting system,* a location-specific probability of precipitation value for each consecutive time period intervals, T, contained within the pre-set time period, t, *wherein the precipitation forecasting system uses artificial intelligence to compute probability of precipitation values for time period intervals of length T in pre-set time periods of length t based on:*

*a number of time periods within the time period interval of length T wherein the most probable amount of precipitation is a trace amount;*

*a number of time periods within the time period interval of length T wherein the most probable amount of precipitation is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t*;

(c) calculating, *by the precipitation forecasting system,* a most probable precipitation amount corresponding to each of the probability of precipitation values;

(d) calculating, *by the precipitation forecasting system,* a location-specific probability of precipitation value for each t/T pairs of consecutive probability of precipitation values; and (e) communicating *via at least one communications channel* said location-specific probability of precipitation values for each consecutive time period intervals, T, said most probable precipitation amount, and said probability of precipitation value for each t/T pairs[, to an end user].

31. The system according to claim 13, wherein the storage means is a networked computer containing a digital database containing the *location-specific probability* forecasting information.

*32. The system according to claim 13, wherein the location-specific probability forecasting information includes information about a specific location.*

*33. The system according to claim 1, further comprising an input module for manually entering an adjusted probability of precipitation value.*

*34. The system according to claim 13, further comprising an input module for manually entering an adjusted probability of precipitation value.*

*35. The system according to claim 1, wherein the time period, T, is selected from one of 1, 2, 3, 4, 5, 6, 10, 12, 15, 30, 45, 60, 120, 180, 240, and 300 minutes.*

*36. The system according to claim 1, wherein the pre-set time period, t, is selected from one of 6, 7, 8, 9, 10, 12, 24, 36, 48, and 96 hours.*

*37. The system according to claim 13, wherein the time period, T, is selected from one of 1, 2, 3, 4, 5, 6, 10, 12, 15, 30, 45, 60, 120, 180, 240, and 300 minutes.*

*38. The system according to claim 13, wherein the pre-set time period, t, is greater than or equal to T and is selected from one of 1, 2, 3, 4, 5, 6, 7, 8, 9, 10, 12, 24, 36, 48, and 96 hours.*

*39. The system according to claim 24, wherein the time period, T, is selected from one of 1, 2, 3, 4, 5, 6, 10, 12, 15, 30, 45, 60, 120, 180, 240, and 300 minutes.*

*40. A system for calculating and communicating probability of precipitation forecasts, the system comprising:*

*a storage device for storing location-specific probability forecasting information;*

*a processing device for computing a probability of precipitation value from the forecast information for any pre-determined time period, T, in a pre-set time period, t, that is greater than or equal to the pre-determined time period, wherein the processing device uses artifi-*

*cial intelligence to compute probability of precipitation values for pre-determined time periods of length T in pre-set time periods of length t based on:*

*a number of time periods within the time pre-determined period of length T wherein a forecasted precipitation amount is a trace amount;*

*a number of time periods within the pre-determined time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t; and*

*a communications subsystem for communicating the probability of precipitation value via at least one communications channel.*

*41. A system for calculating and communicating probability of precipitation forecasts for periods that are not fixed to specific pre-set times, the system comprising:*

*a storage device for storing location-specific probability forecasting information;*

*a processing device for computing a probability of precipitation value from the forecast information for any time period, T, in a pre-set time period, t, wherein the probability of precipitation values are not fixed to a specific pre-set time, but are recalculated to a present time, and wherein the processing device uses artificial intelligence to compute probability of precipitation values for time periods of length T in pre-set time periods of length t based on:*

*a number of time periods within the time period of length T wherein a forecasted precipitation amount is a trace amount;*

*a number of time periods within the time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t; and*

*a communications subsystem for communicating the probability of precipitation value via at least one communications channel.*

*42. A system for calculating and communicating probability of precipitation forecasts, the system comprising:*

*a probability of precipitation system including:*

*a probability of precipitation forecast model for computing a probability of precipitation value for a time period, T, within a pre-set time period, t, that is greater than or equal to the time period, wherein the probability of precipitation forecast model uses artificial intelligence to compute probability of precipitation values for time periods of length T in pre-set time periods of length t based on:*

*a number of time periods within the time period of length T wherein a forecasted precipitation amount is a trace amount;*

*a number of time periods within the time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t;*

*a most probable precipitation amount forecast model for computing a precipitation amount value corresponding to each probability of precipitation value; and*

*a communications device for communicating the probability of precipitation and precipitation amount values electronically to a remote requestor.*

*43. A computer-implemented method for calculating and communicating at least one probability of precipitation forecast, comprising the steps of, at a precipitation forecasting system:*

*determining by the precipitation forecasting system, a first probability of precipitation value for a first time period, T, within a pre-set time period, t, based upon:*

*a number of time periods within the first time period, T, wherein a forecasted precipitation amount is a trace amount; and*

*a number of time periods within the first time period, T, wherein a forecasted precipitation amount is greater than or equal to a pre-set amount;*

*determining, by the precipitation forecasting system, a second probability of precipitation value for a second time period overlapping at least a part of the first time period, based upon:*

*a probability of precipitation value for the pre-set time period of length t;*

*a probability of precipitation value for a next consecutive time period of length t; or*

*a probability of precipitation value for a previous consecutive time period of length t;*

*determining, by the precipitation forecasting system, a third probability of precipitation value based on the first and second values; and*

*communicating the third probability of precipitation value via at least one communications channel.*

*44. The method according to claim 43, further comprising the step of adjusting the third probability of precipitation value before performing the step of communicating the value.*

*45. The method according to claim 43, further comprising the step of determining a fourth probability of precipitation value for a third time period that is equal in duration to the first time period, wherein the first and third time periods are within the pre-set time period, t.*

*46. The method according to claim 45, further comprising the step of determining a fifth probability of precipitation value based on the third and fourth probability of precipitation values.*

*47. The method according to claim 43, wherein the third probability of precipitation value is a probability of precipitation of rain, snow, or ice.*

*48. The method according to claim 43, wherein the third probability of precipitation value is communicated as a percentage chance.*

*49. The method according to claim 43, further comprising communicating a most probable amount value for the first time period via the least one communications channel.*

*50. The method according to claim 49, wherein the most probable amount value is a numerical value representing the most probable amount of precipitation that may fall during the first time period, expressed in equivalent inches of water.*

*51. The method according to claim 43, wherein the step of communicating the third probability of precipitation value*

*includes a graphic depicting when during the pre-set time period precipitation will likely occur.*

*52. The method according to claim 43, wherein the communications channel is the Internet.*

*53. The method according to claim 43, wherein the first time period is selected from one of 1, 2, 3, 4, 5, 6, 10, 12, 15, 30, 45, 60, 120, 180, 240 and 300 minutes.*

*54. The method according to claim 43, wherein the pre-set time period is selected from one of 1, 2, 3, 4, 5, 6, 7, 8, 10, 24, 36, 48, and 96 hours.*

*55. The method according to claim 43, wherein there are a plurality of time intervals before and after the first time period, and a plurality of equal time intervals within the first time period, further comprising the steps of:*

*determining whether the amount of precipitation for each of the equal time intervals within the first time period is equal to zero;*

*if it is not determined that the amount of precipitation for each of the equal time intervals within the first time period is equal to zero, determining whether the amount of precipitation for each of the equal time intervals within the first time period is less than or equal to a trace amount; and*

*determining whether the amount of precipitation for at least one time interval before the first time period and the amount of precipitation for at least one time interval after the first time period is greater than or equal to 0.01 inches.*

*56. The method according to claim 43, further comprising the step of:*

*determining for each of a plurality of equal time intervals within the first time period, T, whether the amount of precipitation for each of the plurality of equal time intervals is less than or equal to a trace amount.*

*57. A system for calculating and communicating probability of precipitation forecasts, the system comprising:*

*a storage device for storing location-specific probability forecasting information;*

*a precipitation forecasting system including a processing device for computing a probability of precipitation value from the forecast information for each of a plurality of pre-determined time periods, T, in a pre-set time period, t, wherein the pre-set time period is greater than or equal to the plurality of pre-determined time periods, and wherein the probability of precipitation forecasting system uses artificial intelligence to compute probability of precipitation values for pre-determined time periods of length T in pre-set time periods of length t based on:*

*a number of time periods within the pre-determined time period of length T wherein a forecasted precipitation amount is a trace amount;*

*a number of time periods within the pre-determined time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t; and*

*a communications subsystem for communicating the probability of precipitation values via at least one communications channel.*

*58. A system for calculating and communicating probability of precipitation forecasts for periods that are not fixed to specific pre-set times, the system comprising:*

*a storage device for storing location-specific probability forecasting information;*

*a precipitation forecasting system including a processing device for computing a probability of precipitation value from the forecast information for each of a plurality of time periods, T, in a pre-set time period, t, wherein the probability of precipitation values are not fixed to a specific pre-set time, but are recalculated to a present time, and wherein the precipitation forecasting system uses artificial intelligence to compute probability of precipitation values for time periods of length T in pre-set time periods of length t based on:*

*a number of time periods within the time period of length T wherein a forecasted precipitation amount is a trace amount;*

*a number of time periods within the time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t; and*

*a communications subsystem for communicating the probability of precipitation values via at least one communications channel.*

*59. A system for calculating and communicating probability of precipitation forecasts, the system comprising:*

*a precipitation forecasting system including:*

*a probability of precipitation forecast model for computing a probability of precipitation value for each of a plurality of time periods, T, in a pre-set time period, t, wherein the pre-set time period is greater than or equal to the plurality of time periods, and wherein the precipitation forecast model uses artificial intelligence to compute probability of precipitation values for time periods of length T in pre-set time periods of length t based on:*

*a number of time periods within the time period of length T wherein a forecasted precipitation amount is a trace amount;*

*a number of time periods within the time period of length T wherein a forecasted precipitation amount is greater than or equal to a pre-set amount;*

*a probability of precipitation value for the pre-set time period of length t;*

*a probability of precipitation value for a next consecutive time period of length t; and*

*a probability of precipitation value for a previous consecutive time period of length t;*

*a most probable precipitation amount forecast model for computing a precipitation amount value corresponding to each of the probability of precipitation values; and*

*a communications device for communicating each of the probability of precipitation and most probable precipitation amount values electronically to a remote requestor.*

* * * * *